United States Patent

Westerlund

[15] 3,640,804
[45] Feb. 8, 1972

[54] METHOD FOR CONDUCTING ELECTROLYTE TO, FROM AND THROUGH AN ELECTROLYTIC CELL

[72] Inventor: Göthe O. Westerlund, Vancouver, Canada
[73] Assignee: Chemech Engineering Ltd., Vancouver, British Columbia, Canada
[22] Filed: July 17, 1969
[21] Appl. No.: 842,623

Related U.S. Application Data

[62] Division of Ser. No. 543,261, Apr. 18, 1966, Pat. No. 3,463,722.

[52] U.S. Cl. ............................................................. 204/95
[51] Int. Cl. .................................... C01b 11/26, C01b 11/14
[58] Field of Search ..................................................... 204/95

[56] References Cited

UNITED STATES PATENTS

| | | |
|---|---|---|
| 665,426 | 1/1901 | Gibbs..................................204/95 |
| 2,797,192 | 6/1957 | Graff et al.............................204/95 |
| 3,518,180 | 6/1970 | Grother..............................204/95 X |
| 3,539,486 | 11/1970 | Fleck....................................204/95 |

FOREIGN PATENTS OR APPLICATIONS 1,502,793  11/1967  France......................................204/95

*Primary Examiner*—F. C. Edmundson
*Attorney*—Stevens, Davis, Miller & Mosher

[57] ABSTRACT

A novel procedure is provided for conducting electrolyte to, from and through an electrolytic cell. This procedure depends on maintaining the cell in a fully flooded state and using the natural pumping action due to rising entrained and/or occluded gaseous products of electrolysis to aid the passage of the electrolyte through the cell at a velocity sufficient to prevent such gaseous products of electrolysis from separating into a free gaseous phase within the cell.

7 Claims, 1 Drawing Figure

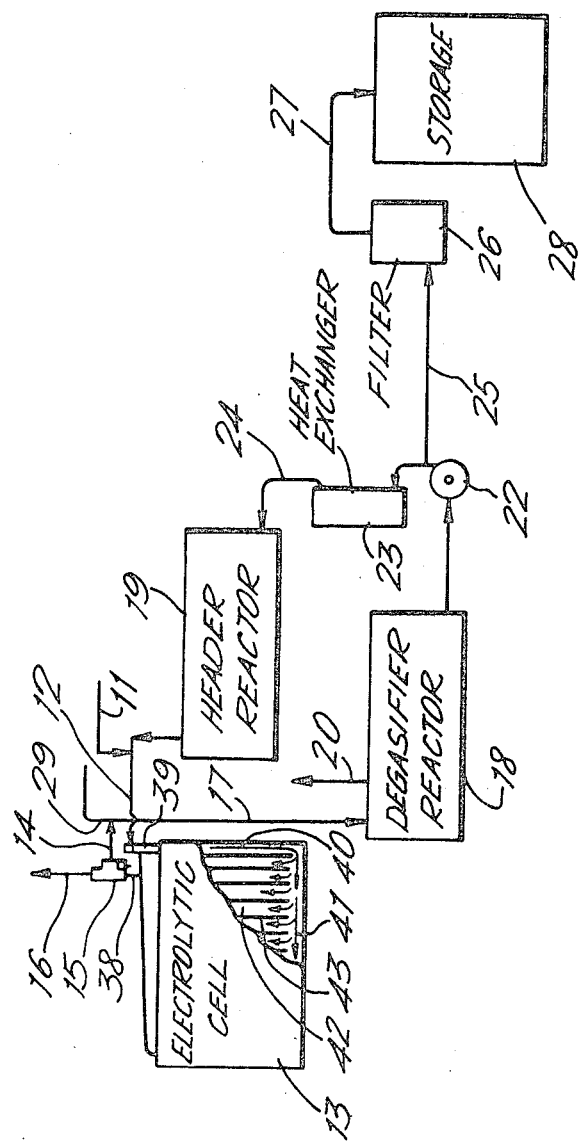

METHOD FOR CONDUCTING ELECTROLYTE TO, FROM AND THROUGH AN ELECTROLYTIC CELL

This application is a division of application Ser. No. 543,261 filed Apr. 18, 1966.

This invention relates to a method for conducting electrolyte through an electrolytic cell during the course of which it is subjected to an electrolytic reaction. It is particularly suitable for an improved method for conducting electrolyte through an electrolytic cell during the course of which it is subjected to an electrolytic reaction, such as one for the production of metal chlorates, especially alkali metal chlorates from sodium chloride brine, or for the production of perchlorates from sodium chlorate solution, or for the production of gaseous chlorine from hydrochloric acid solutions, or (if the cell is a diaphragm cell) for the production of gaseous chlorine and gaseous hydrogen.

The conducting of electrolyte through known electrolytic cells for the production of metal chlorates using consumable carbon electrodes inherently brings about certain disadvantages. Monopolar cells inherently have many power connections and electrolyte branches, high-electrode-stub losses, high-voltage drops and high-power losses, which losses are enhanced by the flowing electrolyte. Furthermore, many units are required in commercial production and much larger building spaces are required.

Bipolar electrolytic cells designed to avoid many of the above difficulties have brought about one major problem. Such cells are designed to operate with a gas phase above the level of the liquid and below the cell cover. The electrical connections to the graphite electrode are situated in this gas phase and accordingly, the danger of sparks occurring, with the resultant explosion, is always present. Furthermore, the means for conducting electrolyte through such cells involved expensive pumping equipment.

An object of a broad aspect of the present invention is the provision of an improved method for conducting electrolyte through an electrolyte cell during the course of which it is subjected to an electrolysis procedure.

By one broad aspect of this invention, there is provided in a method for conducting electrolyte through an enclosed electrolytic cell including one or more electrolytic zones, each such electrolytic zone being defined by the space between an anodic electrode and an adjacent cathodic electrode, wherein effluent is separated into gaseous products of electrolysis and liquor containing other products of electrolysis, and wherein a selected portion of the separated effluent liquor reenters the enclosed electrolytic cell, the improvement comprising the steps of: conducting the electrolyte through the electrolytic cell, while maintaining the cell in a flooded state and substantially full of electrolyte, at a sufficiently high rate that entrained and/or occluded gaseous products of electrolysis are prevented from separating into a gaseous phase within the cell, the electrolyte being abetted in its passage through the cell by virtue of natural pumping action due to the rising entrained and/or occluded gaseous products of electrolysis; permitting effluent liquor, comprising electrolyte containing in substantially homogeneous form, both products of electrolysis in ion form and as entrained and/occluded gaseous products of electrolysis, to flow out of the enclosed cell; allowing the gaseous products of electrolysis to separate from the effluent liquor in a zone outside the enclosed electrolytic cell; and allowing a selected portion of the separated effluent liquor to reenter the enclosed electrolytic cell.

By a further aspect of this invention, a method is provided for conducting an electrolyte through an enclosed electrolytic cell including an electrolytic zone and a plurality of nonelectrolytic zones, the method comprising: feeding electrolyte through the electrolytic cell while maintaining the cell in a flooded condition and substantially full of electrolyte; conducting the electrolyte through the cell, the electrolyte being abetted in its passage through the cell by virtue of natural pumping action due to rising entrained and/or occluded gaseous products of electrolysis; withdrawing effluent liquor including entrained and/or occluded gaseous products of electrolysis from the cell; separating the gaseous products from the effluent liquor; and refeeding liquor to the electrolysis zone.

The present invention, in one of its many aspects, is concerned with the well-known procedure for the production of metal chlorates, particularly alkali metal chlorates, from metal chlorides, particularly alkali metal chlorides, although it can be used for the production of perchlorates and hypochlorites. It is well known that alkali metal chlorates may be prepared by electrolysis of an aqueous solution of an alkali metal chloride. In this process elemental chlorine is evolved at the anode and alkali metal hydroxide at the cathode. However, in the cells used in the method of one aspect of this invention, since there is no diaphragm between the cathode and the anode, the primary products of the electrolysis react to form the alkali metal chlorate. However, the present invention embraces improved methods of operation of chlorine-alkaline cells, cells for the electrolysis of hydrogen chloride for the production of hydrogen and chlorine, and/or cells for the electrolysis of water to produce hydrogen and oxygen.

The simplified reaction in the aforesaid alkali metal chlorate electrolysis may be summarized as:

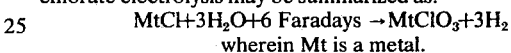

wherein Mt is a metal.

The main reactions in the electrolytic preparation of the metal chlorate from the metal chloride may be represented as follows:

PRIMARY REACTIONS

A. at the anode:

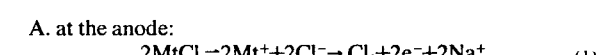 (1)

B. at the cathode:

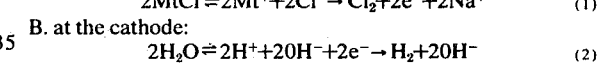 (2)

SECONDARY REACTIONS

C.  (3)

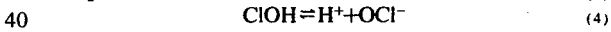 (4)

D. 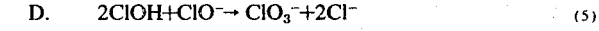 (5)

UNDESIRABLE SIDE REACTIONS

E. Oxidation at the anode:

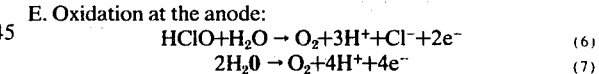 (6)

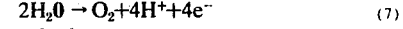 (7)

F. Reduction at the cathode:

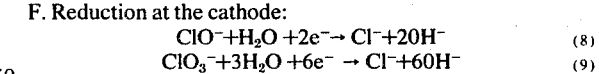 (8)

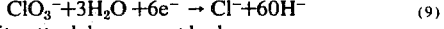 (9)

G. Hypochlorite attack by nascent hydrogen:

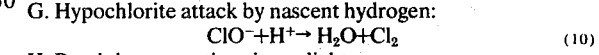 (10)

H. Breakdown reactions in sunlight:

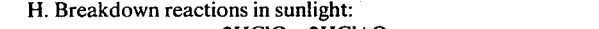 (11)

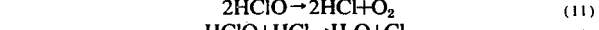 (12)

I. Breakdown reaction in the presence of catalysts:

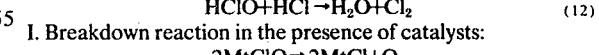 (13)

J. Breakdown due to vapor pressure:

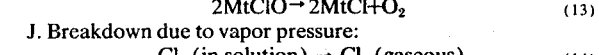 (14)

It is manifest that conditions within the electrolysis system in general and in the electrolytic cell in particular should be carefully controlled in order to obtain the optimum desired final product and to obtain a high current efficiency.

In an essential step in the method of this invention, the cell is specifically and expressly filled with the electrolyte. Operation of the cell should be carried out at a high velocity throughout so that the gaseous products of the electrolysis are retained in the electrolyte as finely divided bubbles. Referring only to flow conditions within the cell, it is observed that the necessary high velocity is dependent upon various factors, but usually is between 2 and 100 feet per minute. But, if the electrodes are graphite, the velocity should not exceed 50 feet per minute. On the other hand, if the electrodes are platinized titanium, a greater velocity can be tolerated, i.e., up to 100 feet per minute. A preferred rate for graphite electrodes is 10 feet per minute. The high velocity not only maintains the gaseous products of the electrolysis entrained and/or occluded in the electrolyte while it is within the cell, but also mixes the fresh electrolyte with the recirculating electrolyte also within the cell. In this way, the temperature within the cell is maintained substantially uniform. This, in turn, minimizes uneven electrode consumption.

In carrying out the improved method of the present invention, entrained and/or occluded gases of the electrolysis reaction are separated from the outgoing liquor in a zone outside the enclosed cell and liquor is permitted to recycle back to the cell. One preferred manner of achieving this end is to provide a primary gas-separation unit and a secondary gas-separation unit. The primary gas-separation unit may be in the form of a T-shaped member having an inlet connected to the cell outlet but outside of the cell itself. The "T" has two outlets, one of which is connected to a source of gaseous pressure, the other of which is connected to the secondary gas separation unit.

It is preferred that the source of gaseous pressure be a negative pressure. This can be achieved either by the step of drawing away the liberated gases or by the use of a pressure drop leg (in the connection to the secondary gas-separation unit) which inherently provides such negative pressure.

Such liquor with the gas bubbles entrained and/or occluded therein is, as outlined above, permitted to enter and small confined space of the primary separation unit as previously described where the gas bubbles separate. In regard to this small confined space, the cross-sectional area should be slightly larger than necessary in order to prevent foaming when the gas escapes. By means of the primary gas-separation unit and the secondary gas-separation unit, the high-velocity outlet liquor whose velocity may be as high as 100 feet per second in the riser leading to the T-separator is decreased in velocity, usually to less than 2 feet per second. The velocity through the primary separation unit, which is preferably less than 2 feet per second is less than the velocity through the outlet riser pipe leading from the cell, but is greater than the velocity through the secondary gas-separation unit. By these means, the amount of gas entrained and/or occluded in the recirculating liquor is usually less than 1 percent. In addition, the gaseous products of the electrolysis reaction may now be removed from the system at a controlled location.

As noted above, it is important to provide a high circulation rate in the cell. In addition, such high rate minimizes local high concentrations of hypochlorite formed in the electrolysis reaction which both decomposes to chlorides (see equation 8) and also consumes the graphite.

The present invention in its preferred aspect combines the natural pumping action due to rising gases with directed internal circulation due to the particular construction and arrangement of the internal electrodes to provide natural circulation. An important consequence of such natural pumping action is that it is self-compensating. In one example, as the current density of the current performing the electrolysis increases, the internal circulation increases. This is due to the fact that the amount of gaseous products of electrolysis increases with increasing current density. Then, assuming the spacing between the bipolar electrodes to remain constant, the specific gravity of the electrolyte is less, causing it to rise faster. The rate of internal circulation, therefore, is due to the natural buoyancy of entrained and/or occluded gaseous products of electrolysis and the difference in specific gravity of the electrolyte in the interelectrode zone and in other zones.

In another example, as the bipolar electrodes are consumed, the internal circulation automatically decreases. This is due to the fact that the space between the bipolar electrodes is increased. Consequently, the above-noted difference in specific gravity is not as great. Thus, as the electrodes are consumed, the internal circulation rate decreases. Since the erosion of the electrodes, as distinct from the consumption of the electrodes is dependent, to some extent, on the rate of circulation, the length of life of the cell tends to be increased because of the self-regulation effect of decreasing the rate of circulation as the bipolar electrode is consumed. The minimum internal rate of circulation depends upon the minimum current density required for selected cell parameters, coupled with the maximum interelectrode space and the external circulation.

Mention has been made heretofore of the current density. The current density is dependent upon the interelectrode space, i.e., the spacing in that part of the electrolyte channel where two bipolar electrodes face one another, and the flow rate in such electrolyte channel. Basically at a flow rate within the cell of 2 feet per minute, a current density of 0.3 amp/in.$^2$ is suitable. At a flow rate within the cell of 100 feet per minute a current density of 1.5 amp/in.$^2$ may be used. At slow rates of flow within the cell, i.e., of the order of 10 feet per minute, current densities of 0.48 amp/in.$^2$ or 0.58 amp/in.$^2$ or 0.9–1.0 amp./in.$^2$ are satisfactory.

The interelectrode space, i.e., electrolytic zone, depends to some extent on the material out of which the electrodes are formed. For graphite electrodes whose thickness (at startup) is ¾ inch, a spacing (at startup) of ⅛ inch to 1 inch is satisfactory. For very thin platinized titanium, on the other hand, the spacing (at startup) would be ⅛ inch to ⅝ inch. With the parameter selected as above-noted, the life of the electrodes may be approximately 18 months.

In the accompanying drawings, the single FIGURE depicts, in schematic form, one manner of carrying out the method of this invention.

Referring now to the drawing, electrolyte, consisting of fresh electrolyte from line 11 and recycled liquor from line 12 enters the electrolytic cell 13 through inlet header 39. The electrolytic cell 13 is so designed that electrolyte is directed downwardly in distributing downcomer 40, is spread along the bottom of the cell through distributor 41 and is then fed upwardly from the bottom through the electrolytic zones 42 between electrodes 43 to the closed top of the cell 13. Electrolysis proceeds and rising entrained and/or occluded gases of electrolysis cause the effluent liquor, consisting of Cl$_2$, Na$^+$, H$_2$, OH$^-$, ClOH, Cl$^-$, H$^+$, and OCl$^-$ (and the gaseous products of electrolysis) to be conducted through the cell at a flow rate of 2 to 100 feet per minute and then to leave via outlet pipe riser 38 now at a velocity of up to 100 feet per second to T-separator 15. The electrolyte then reduces its velocity to about 2 feet per second and hence entrained and/or occluded gases are permitted to separate in T-separator 15. The gases which consist of H$_2$, H$_2$O (vapor), O$_2$, CO$_2$ and Cl$_2$, leave via vent line 16. The effluent liquor passes from T-separator 15 via line 17 to degasifier-reactor 18.

The cross-sectional area of the degasifier-reactor 18 is specifically designed and is of such a size that the liquor velocity is reduced to such an extent that optimum separation of the entrained and/or occluded gases takes place while minimizing foaming and substantially reducing short circuiting through the tank, which would result from too low a liquor velocity. The velocity, on the other hand, must be sufficient to utilize the entire vessel but should not be too rapid to inhibit the further expulsion of the entrained and/or occluded gases. The optimum velocity is a function of the apparent density of the liquor, which, in turn, is dependent on the amount of entrained and/or occluded gases and the bubble size. It has been found that a liquor velocity of less than 2 ft./sec. can separate more than 95 percent and even as great as 99 percent of the entrapped gases.

The degasifier-reactor 18 also is for the purpose of permitting the reaction:

$$\text{amps/liter } ClOH + ClO^- \rightarrow ClO_3^- + 2Cl^- \qquad (5)$$

to take place. For any selected temperature, the retention time in the degasifier-reactor 18 is a function of the concentration of ClOH and ClO$^-$ present in the liquor which in turn is directly related to the current density. Thus, it was found that to yield a current efficiency of greater than 90 percent, with a constant recirculation of liquor and a pH of 6.5, the current concentration should be less than 4.5 amps./liter at 50° C. or less than 3 amps/liter at 35° C. The current concentration (in amps/liter is the main determining factor in calculating the reacting chamber volume. The retention time, on the other hand, is dependent on the rate of the liquor circulation, as well as on the volume of the reaction vessel. For convenience, the reaction vessel is divided into two vessels, i.e., degasifier-reactor 18 and header-reactor 19, which will be described hereinafter.

The particular arrangement of the degasifier-reactor 18 enables it to be used as a liquor seal for the cell gases carried off through line 16. In addition, the degasifier-reactor 18 is provided with a vent line 20 where gases which have been released from the liquor may be withdrawn. These gases are combined with the gases in line 16 and may be vented as waste, or may be oxidized, as will be described hereinafter.

The liquor entering the degasifier-reactor 18, in a preferred embodiment, has a temperature of about 45° C. As a result of the reaction therein, the effluent liquor has a temperature of about 45.5° C. The effluent liquor passes via line 21 to pump 22 to the heat exchanger 23 where it is again cooled to about 45° C. The pump provides the enforced circulation to overcome the drag of the heat exchanger. The effluent from the heat exchanger 23 passes via line 24 to the header-reactor 19.

Header-reactor 19 is a second reacting chamber where the reaction summarized by equation (5) takes place. Care is taken to avoid short-circuiting and channelling to maintain a constant reaction or retention time. It is important to control precisely the temperature in header-reactor 19. The higher the temperature, the lower the volume of the header-reactor 19, with its attendant upsetting of the retention time. A longer retention time favors the desirable reaction $$NaOCl + 2HClO \rightarrow NaClO_3 + 2HCl$$

It is also important to minimize the concentration of the hypochlorite for if it is too high, it will decompose, as shown in equation (8).

In addition, the pH must be less than 7 preferably between about 5 and 7. At a pH of 6.8, the optimum reaction of 2 moles of HClO to 1 mole of NaOCl takes place.

It is also noted that the header-reactor 19 serves, in addition to being a reaction vessel, as a header and pipeline for the recycle of the liquor.

From the header-reactor 19, the liquor proceeds via line 12 to the cell 13.

A branchline 25 leads from degasifier-reactor 18 to a filter 25, where particles of graphite and other matter are filtered out, and then through line 27 to a chlorate storage tank 28. It is preferred that a recycle rate of from 200:1 to 500:1 takes place, i.e., that 200 to 500 parts be recycled for each part to storage.

If it is desired to oxidize the gases from lines 16 to 20, it is noted that the gases have the following ranges of proportions:

| | | |
|---|---|---|
| Hydrogen, $H_2$ | 89–94 | % by volume |
| Water vapor, $H_2O$ | 3–6 | % by volume |
| Oxygen, $O_2$ | 2–4 | % by volume |
| Carbon dioxide, $CO_2$ | 0.3–0.6 | % by volume |
| Chlorine, $Cl_2$ | 0.2–1 | % by volume |

In combusting the gases the following reaction will take place:

$$H_2 + Cl_2 \rightarrow 2HCl \text{ (producing hydrogen chloride)}$$
$$2H_2 + O_2 \rightarrow 2H_2O \text{ (producing water vapor)}$$

The hydrogen chloride is recovered as hydrochloric acid by scrubbing with water. The excess hydrogen is recovered by absorbing the $CO_2$ in an absorbent and then dehydrating the residual gas.

It is generally known that the oxygen content of the cell gas decreases with lower pH of electrolyte simultaneously as chlorine losses increase. Using a combustion chamber for recovery of chlorine losses as hydrochloric acid, the cell may be operated at low pH and thus benefit by the resulting improved current efficiency as well as the lower electrode consumption. In fact, as shown in the drawing, chlorine may be added to the cell gases through line 29 for complete combustion of all hydrogen to hydrochloric acid and water vapor. The residual gas, mainly containing water vapor and carbon dioxide may be partly recirculated for control of hydrogen and chlorine concentrations to avoid an explosive gas composition.

I claim:

1. In a method of conducting electrolyte through an enclosed electrolytic cell including one or more electrolytic zones, each such electrolytic zone being defined by the space between an anodic electrode and an adjacent cathodic electrode, wherein effluent is separated into gaseous products of electrolysis and liquor containing other products of electrolysis, and wherein a selected portion of the separated effluent liquor reenters the enclosed electrolytic cell, the improvement comprising the steps of: conducting the electrolyte through the electrolytic cell, while maintaining said cell in a flooded state and substantially full of electrolyte, at a sufficiently high rate that entrained and/or occluded gaseous products of electrolysis are prevented from separating into a gaseous phase within said cell, the electrolyte being abetted in its passage through the cell by virtue of natural pumping action due to the rising entrained and/or occluded gaseous products of electrolysis; permitting effluent liquor, comprising, in substantially homogeneous form, electrolyte containing both products of electrolysis in ion form and as entrained and/or occluded gaseous products of electrolysis, to flow out of said enclosed cell; allowing said gaseous products of electrolysis to separate from the effluent liquor in a zone outside said enclosed electrolytic cell; and allowing a selected portion of said separated effluent liquor to reenter said enclosed electrolytic cell.

2. A method for conducting an electrolyte through an enclosed electrolytic cell including an electrolytic zone and a plurality of nonelectrolytic zones, the method comprising: feeding electrolyte through the electrolytic cell while maintaining said cell in a flooded condition and substantially full of electrolyte; conducting the electrolyte through the cell, the electrolyte being abetted in its passage through the cell by virtue of natural pumping action due to rising entrained and/or occluded gaseous products of electrolysis; withdrawing effluent liquor including entrained and/or occluded gaseous products of electrolysis from the cell; separating the gaseous products from the effluent liquor; and refeeding liquor to the electrolysis zone.

3. The method as set forth in claim 1 including the step of first feeding the electrolyte downwardly in one of the nonelectrolytic zones.

4. The method as set forth in claim 1 wherein the electrolyte in passing through the cell is moving upwardly at a speed of between about 2 and about 100 feet per minute, abetted by the upward movement of entrained and/or occluded gaseous products of the electrolysis.

5. The method as set forth in claim 1 wherein the electrolyte in passing through the cell is moving upwardly at a speed of about 2 to about 50 feet per minute, abetted by the upward movement of entrained and/or occluded gaseous products of the electrolysis.

6. The method as set forth in claim 1 including the step of continuously adding fresh electrolyte to the system.

7. The method as set forth in claim 1 wherein the means allowing the effluent liquor to flow out of said enclosed cell is a riser, and wherein the product is flowing upwardly and outwardly at a velocity of 2 to 100 feet per second.

* * * * *